July 14, 1931.   A. S. O. VON ZWEIGBERGK   1,813,975
BEARING FOR RAILWAY VEHICLES OR THE LIKE Filed Aug. 22, 1928

INVENTOR
Adolf Sixten Olof von Zweigbergk
by Herbert J. Barlow
Attorney

Patented July 14, 1931

1,813,975

UNITED STATES PATENT OFFICE

ADOLF SIXTEN OLOF von ZWEIGBERGK, OF GOTTENBORG, SWEDEN, ASSIGNOR TO AK-TIEBOLAGET SVENSKA KULLAGERFABRIKEN, OF GOTTENBORG, SWEDEN, A JOINT-STOCK COMPANY

BEARING FOR RAILWAY VEHICLES OR THE LIKE

Application filed August 22, 1928, Serial No. 301,252, and in Sweden March 31, 1928.

The present invention refers to such bearing devices for railway vehicles or the like which permit both of a radial and a rocking movement of the wheel axles in relation to the frame of the vehicle. This free movement of the axles with the set of wheels pertaining thereto is of importance particularly when driving in curves, inasmuch as additional loads and spring fractures and impacts involved thereby are thus avoided.

In the bearing devices of the above-mentioned type and operation as hitherto known, special link arrangements or series-coupled oscillating straps must be provided between the carrying springs and bearing boxes, which results in that the construction is rendered rather complicated and expensive and also less reliable.

The present invention has for its object to bring about a materially simplified construction of such bearing devices as well as a more reliable operation.

The invention consists substantially in the provision at each axle end, of a yoke or the like which is vertically movable in the frame of the vehicle and connected with a carrying spring system, said yoke forming a guide for a rockable bearing box, containing a self-adjusting bearing system. The said yoke or the like is further to be supported by the bearing box in one or more places situated below the centre of the axle.

An embodiment of a bearing device according to this invention is shown by way of example in the accompanying drawings.

Figure 1:
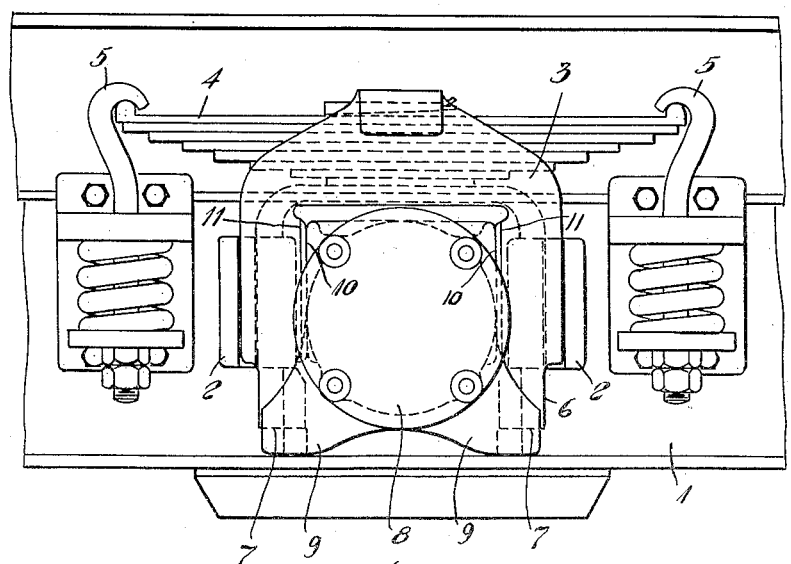
Figure 2:
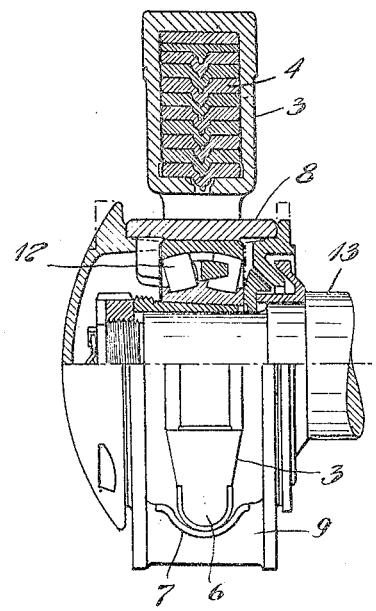

Fig. 1 is an elevation of a portion of the frame with the bearing device viewed from the end thereof. Fig. 2 is an elevation of the bearing device to an enlarged scale and shown in partial section through the axle.

In the drawings, 1 designates the frame of the vehicle having guides 2 with slide rails provided thereon, said slide rails forming guides for a vertically movable yoke 3. Built into the upper part of said yoke is a leaf spring system 4, from which the frame 1 is suspended by means of spring actuated hooks 5. The lower ends of the spring yoke 3 are formed as half-round edges 6 bearing against corresponding seats or recesses 7 in supporting arms 9 cast onto the bearing box 8, said supporting arms being situated below the centre of the axle. The bearing box 8 is provided on its outer sides with guide-planes 10 bearing against plane guides 11 formed on the inner side of the yoke 3, so that the bearing box will be free to rock about the half-round edges 6. Built into the bearing box 8 is a self-adjusting roller bearing 12 for the wheel axle 13.

Through the construction shown, an unhampered radial movement of the bearing box 8 with the axle 13 is permitted by the vertical guiding of the yoke 3 in the guides 2, as well as a rocking movement by reason of the possibility of the bearing box to oscillate about the edges 6 and by the simultaneous self-adjustment of the bearing 12.

The link devices or series-coupled links as hitherto required may thus be entirely dispensed with, and as a substitute only a simple spring yoke and a self-adjusting bearing or bearing system built into the bearing box are required.

What I claim is:—

1. A bearing device for railway vehicles comprising a self-adjustable bearing, an axle box enclosing said bearing and adapted to swing about the centre of the bearing, a vertically movable yoke and a spring system connected thereto, said yoke being supported by the said axle box below the centre of the bearing.

2. A bearing device according to claim 1 having supporting arms on said axle box forming seats and edges provided at the lower ends of said yoke bearing on said seats.

In testimony whereof I affix my signature.

ADOLF SIXTEN OLOF von ZWEIGBERGK.